July 20, 1965   R. A. ONANIAN   3,195,266
CONSTRUCTION TOY COMPRISING BLOCKS AND COUPLING MEANS
Filed May 7, 1962   3 Sheets-Sheet 1

INVENTOR.
RICHARD A. ONANIAN
BY *Shanley & O'Niel*
ATTORNEY

July 20, 1965  R. A. ONANIAN  3,195,266
CONSTRUCTION TOY COMPRISING BLOCKS AND COUPLING MEANS
Filed May 7, 1962  3 Sheets-Sheet 2

INVENTOR
RICHARD A. ONANIAN
BY Shanley & O'Neil
ATTORNEY

July 20, 1965 R. A. ONANIAN 3,195,266
CONSTRUCTION TOY COMPRISING BLOCKS AND COUPLING MEANS
Filed May 7, 1962 3 Sheets-Sheet 3

INVENTOR
RICHARD A. ONANIAN
BY Shanley & O'Neil
ATTORNEY

United States Patent Office 3,195,266
Patented July 20, 1965

3,195,266
CONSTRUCTION TOY COMPRISING BLOCKS AND
COUPLING MEANS
Richard A. Onanian, 105 Wildwood Ave.,
Arlington 74, Mass.
Filed May 7, 1962, Ser. No. 192,702
6 Claims. (Cl. 46—26)

The present invention relates to construction sets, and more particularly to such sets which are comprised of a plurality of connectible and interchangeable units and which may be used as toys or in the construction of models or in similar ways.

Building sets such as toy construction sets and the like as heretofore known to the prior art have suffered from a great number of disadvantages. The connecting or attachment means have heretofore formed an actual part of the structure and have thus greatly limited the variety of the forms which could be constructed. Another drawback of known devices has been that the assembly and disassembly thereof have been quite complicated and laborious; and this has destroyed the pleasure of the users. Furthermore, prior construction sets have lacked any close resemblance or similarity to actual three-dimensional structures, and thus have not given a realistic or satisfying appearance.

Among the other drawbacks of the prior art has been the disadvantage that only the most simple or elementary structures could be constructed with the known sets. Insofar as more complex structures could be achieved, these were accomplished at the expense of the regularity and natural formation of the completed structure. Finally, construction sets as heretofore known to the prior art have been directed toward a relatively restricted age bracket or level of intelligence.

In an effort to overcome these disadvantages, I have previously proposed construction sets as disclosed in my Patent No. 2,885,822, May 12, 1959. Although the construction sets of that patent are an enormous advance over what had been known, they nevertheless suffer from the disadvantages that the connecting means are sometimes difficult to remove without the aid of special tools, that the variety of positions in which the components can be arranged relative to each other is to some extent limited, and that the spacing of the components at uneven increments of distance is difficult. By contrast, however, the present invention overcomes the difficulties even of my improved structure as previously patented.

Accordingly, it is an object of the present invention to provide a construction set which will permit the construction of models or toys closely resembling actual building or architectural framework.

A further object of the invention is the provision of a construction set enabling the employment of a wide variety of construction methods.

A still further object of the invention is the provision of a construction set capable of use in an almost unlimited variety of forms of construction.

The invention also contemplates the provision of a construction set which will permit the scaling of models to almost any ratio.

Another object of the invention is the provision of a construction set which will have a high degree of rigidity.

A further object of the invention is to provide a construction set which will be appropriate for all age groups.

Still another object of the invention is the provision of a construction set which may be readily disassembled without the aid of a variety of tools.

A further object of the invention is the provision of a construction set in which the parts may be oriented relative to each other in a great variety of ways.

A further object of the invention is the provision of a construction set in which the components may be spaced various distances from each other.

Finally, it is an object of the present invention to provide a construction set which will be simple and inexpensive to manufacture, quick and easy to assemble and disassemble, and rugged and durable in use.

Other objects and advantages of the present invention will become apparent from a consideration of the following description, taken in connection with the accompanying drawings, in which.

Figure 2:
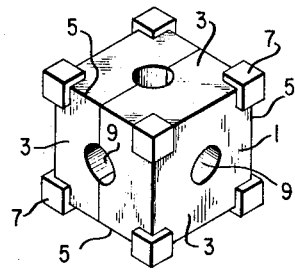
FIGURE 2 is a perspective view of a block comprising one component of my invention.
Figure 3:
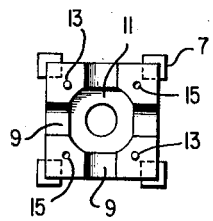
FIGURE 3 is a front elevational view of one-half of the block of FIGURE 2, viewed from the inner side which will be hidden when the block is assembled.
Figure 4:
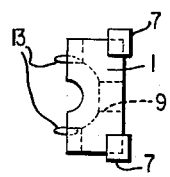
FIGURE 4 is a side elevational view of the block half of FIGURE 3.
Figure 1:
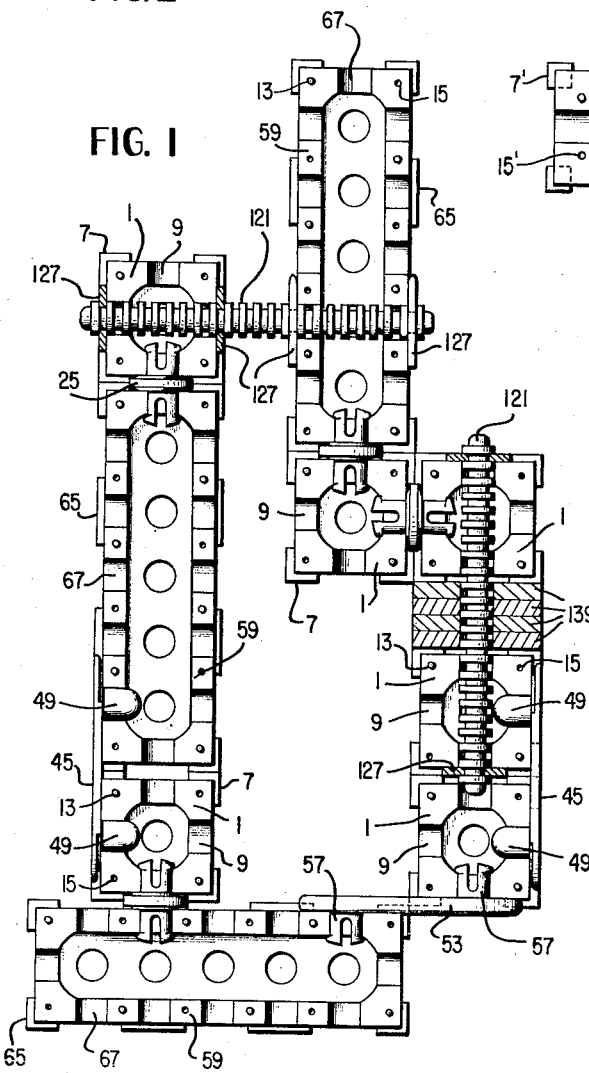
FIGURE 1 is a view with parts broken away showing one of the many structures which may be assembled from the construction set according to my invention.

Referring now to the drawings in greater detail, there is shown in FIGURE 1 a typical assembly of a construction set according to my invention. The individual elements of this construction set are shown in the succeeding figures. Thus, in FIGURE 2, a block 1 is shown which has six flat faces 3 that meet each other in edges 5, faces 3 extending all the way to edges 5 of the block. Spacers 7 at the corners of the blocks assure that when the blocks come into contact with a flat surface or with other such spacers, the faces 3 will be spaced from and parallel to the interface of block 1 with the other object. Faces 3 extend laterally outward between spacers 7, spacers 7 extending outward from and normal to faces 3 on all six sides of block 1.

Each face 3 is provided with a central bore 9 normal to face 3 and extending into the interior of the block. The entrance to bore 9, like the entrances to the bores of all forms of this invention, may be tapered or beveled if desired, to assist in inserting the coupling members to be described below.

Bores 9 terminate inwardly in a common enlarged cavity 11. Each block 1 is made up of a pair of block halves that mate with each other, one bore 9 and half of four other bores 9 and half of central cavity 11 being disposed in each block half. Locator lugs 13 project from the mating faces of the block halves, while complementary holes 15 are also provided in these mating faces to receive the locator lugs 13 of the mating block halves. All the block halves may be identical, it being necessary only to turn them 90° relative to each other to assure that lugs 13 and holes 15 match. The assembled block halves may then be bonded to each other thermally or by cement or the like.

Figure 5:
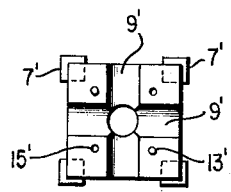
FIGURE 5 is a view similar to FIGURE 3 but showing half of a modified form of block according to the invention.

FIGURE 5 shows a modified form of block half, for construction of a block that has no central cavity such as central cavity 11 of block 1. Thus, the bores 9' of the block of FIGURE 5 simply meet each other in the middle of the block. Such a block is better adapted for use with the coupler of FIGURE 6 than with the coupler of FIGURE 7, for the enlarged heads 33 of the coupler of FIGURE 7 are useful for snapping into a central cavity of a block, as described in greater detail in my above-identified patent.

Figure 6:
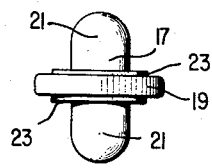
FIGURE 6 is a view of one form of coupling means according to the invention.

In FIGURE 6 is shown coupling means by which the blocks of the present invention may be detachably held together. The item of FIGURE 6 is a coupler 17 including a circular central flange 19 and a pair of coaxial pins 21 that extend axially outward from flange 19 in opposite directions. Flange 19 is undercut at 23 on each side thereof a distance several times greater radially of flange 19 than axially thereof.

Figure 7:
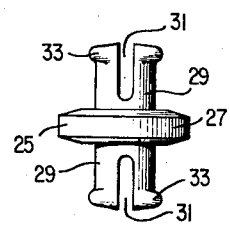
FIGURE 7 is a view similar to FIGURE 6 but showing a modified form of coupling means.

FIGURE 7 shows another form of coupling means, comprising a coupler 25 having a central flange 27 with coaxial pins 29 extending in opposite axial directions from flange 27. It should be noted, however, that although the flange 27 of coupler 25 is undercut, it is not undercut in the same way as coupler 17. The undercut of coupler 17 provides a sharp inner shoulder, while the undercut of flange 27 of coupler 25 is bevelled. However, this bevel extends radially inward several times its extent axially of coupler 25. It should also be noted that pins 29 are not solid as in the case of pins 21 of FIGURE 6 but rather are spaced apart at 31 to provide two pin halves that lend a measure of resilience to the pins. These pin halves terminate at the ends of the pins in enlarged heads 33 which can thus spring back and forth relative to each other.

In use, the blocks and couplers are assembled as shown in FIGURE 1 with the opposite pins of each coupler disposed in frictionally gripped engagement in adjacent bores of contiguous blocks. In that position, the spacers 7 of the blocks contact each other to space the opposed faces 3 of the blocks apart a distance at least as great as and preferably about equal to the thickness of flanges of the couplers. In this position, the flanges of the couplers rest against the opposed faces of the blocks and the main portions of the flanges are spaced from those spacers a distance equal to the axial extent of the undercuts of the flanges, whether those undercuts take the form of FIGURE 6 or the form of FIGURE 7.

Figure 9:
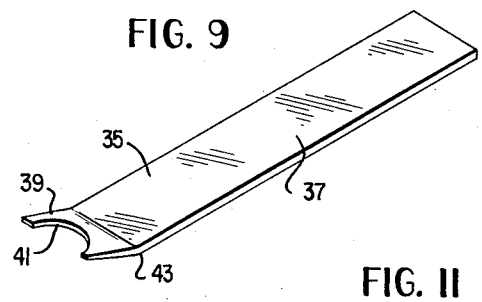
FIGURE 9 is a perspective view of a disassembly tool for use with the present invention.

As has been noted above, the faces of the blocks extend all the way out to the edges of the blocks between the spacers. This is to permit easy disassembly of the blocks and couplers. To disassemble a block and coupler assembly, it is necessary only to pull the blocks apart, whereupon the coupler will remain with one or the other block. This block and coupler assembly can then be disassembled manually or more easily by use of a tool. A suitable such tool 35 is shown in FIGURE 9, comprising an elongated handle 37 that terminates in a working end 39 disposed at an obtuse angle to handle 37. Working end 39 is recessed at its forward edge as at 41, leaving forwardly extending portions of the tool on either side of the recess. Working end 39 joins handle 37 in a shoulder 43 that provides a fulcrum about which the tool may be rocked to raise working end 39.

Figure 10:
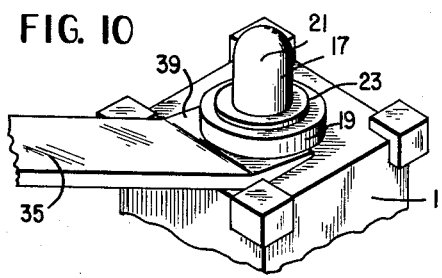
FIGURE 10 is a fragmentary perspective view of the tool of FIGURE 9 used on the assembly of FIGURE 8.
Figure 11:
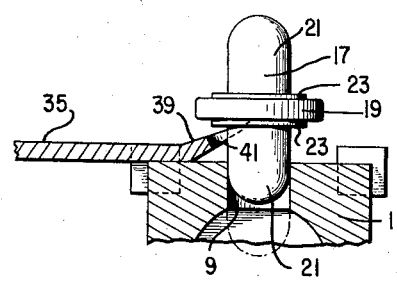
FIGURE 11 is an elevational cross-sectional view of the structure of FIGURE 10 showing the coupler almost removed by the tool.

The disassembly of a block and coupler subassembly by means of tool 35 is shown in FIGURES 10 and 11. Bearing in mind that the flange of the coupler will be spaced from the face of the block by the undercut, the working end of the tool is inserted beneath that spaced portion of the flange and the tool is rocked and downward pressure is exerted on the handle of the tool to effect the movement indicated in FIGURE 11, in which the coupler is shown as it is being raised from the block.

Figure 8:
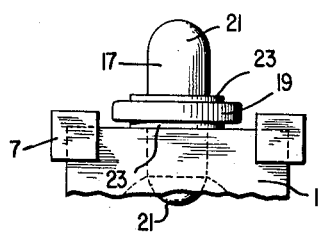
FIGURE 8 is a fragmentary view showing the relationship of a block and a coupler to each other.

It is very important to notice that the present invention facilitates the use of a tool such as tool 35. This is because the faces against which the tool can bear extend all the way out to the edge of the block, so that there is no rim of the block to bar the tool from effective use. The tool may thus be inserted between the spacers which are at the corners of the blocks; and this desirable relationship is true not only when the blocks are assembled as indicated in FIGURE 8, but also when the blocks are assembled in other orientations relative to each other or by the use of other couplers as will be described later.

Figure 12:
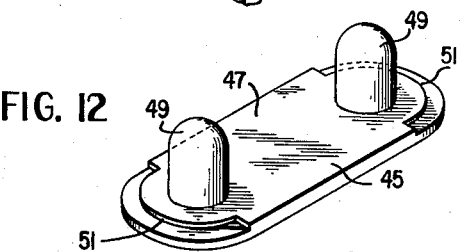
FIGURE 12 is a perspective view of a modified form of coupler.

Instead of disposing the blocks with their contiguous faces opposed and confronting each other, it is also possible to arrange them with their contiguous faces coplanar and facing in the same direction. To this end, a modified coupler 45 is shown in FIGURE 12, including a flange 47 which is considerably elongated as compared to the flanges of the preceding couplers. Pins 49 extend perpendicular to the plane of flange 47; but these pins have parallel axes that are spaced apart. Moreover, both pins 49 extend from the same side of coupler 45. As in the preceding coupler embodiments, the edges of flange 47 are undercut several times as far transversely of pins 49 as axially thereof, as at 51, for the reception of a tool such as tool 35. The coupler of FIGURE 12 is used as seen at the extreme right of FIGURE 1. As is apparent from the showing in that figure, the flange 47 of coupler 45 extends between a pair of spacers 7 of each adjacent black 1 and is of a thickness no greater than and preferably equal to the distance by which those spacers 7 extend above their associated faces 3. Coupler 45 thus crosses an edge 5 of each block 1, for these edges are disposed below the outer contour of spacers 7.

Figure 13:
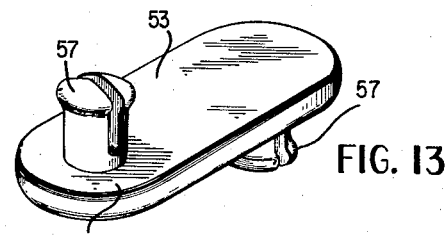
FIGURE 13 is a perspective view of still another form of coupler.

Another way of assembling the blocks relative to each other is as shown in the lower right-hand corner of FIGURE 1, namely, with their contiguous faces parallel to each other but facing in opposite directions and offset from each other, that is, with the bores that receive the couplers parallel but spaced a substantial distance apart and opening in opposite directions. To this end, a coupler such as coupler 53 is provided as shown in FIGURE 13. Each such coupler has an elongated flange 55 and pins 57 that extend therefrom along spaced parallel axes. In the case of coupler 53, however, the pins 57 extend in opposite directions from flange 55. Also, flange 55 of coupler 53 is of a thickness equal to the sum of the distances by which the associated block spacers extend from their respective blocks, or in the embodiments illustrated in FIGURE 1, in which all the spacers are of the same height, twice the thickness of flange 47 of coupler 45. Coupler 53 is shown in an enlarged perspective view in FIGURE 13.

It should also be noted that coupler 53 has no undercut as do the preceding couplers. This is because in the case of the elongated coupler forms of FIGURES 12 and 13, the undercutting of the flanges is not necessary. When two blocks are pulled apart that are interconnected by the couplers of either of FIGURE 12 or FIGURE 13, an elongated coupler portion will be left projecting from the other block, and this elongated coupler portion is not difficult to grasp so as to remove the coupler from the remaining block. On the other hand, however, the use of undercuts on all coupler forms thus far disclosed is preferable because it minimizes twisting of the couplers and enables the couplers to be made of relatively lighter weight material than if the couplers and blocks were to be wrenched apart by hand.

Figure 14:
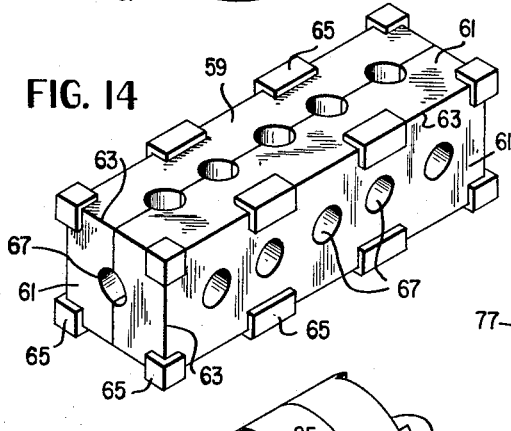
FIG. 14 is a perspective view of an elongated block of the present invention.

A modified form of block, comprising an elongated block 59, is shown in FIGURE 14. Block 59 has faces 61 that terminate in edges 63 and spacers 65 between which the edges 63 are disposed, faces 61 and edges 63 being disposed inward from the outer faces of spacers 65. Blocks 59 have bores 67 therein the same as do blocks 1; but in the case of elongated blocks 59, plural bores 67 are provided in each of the elongated side faces 61. The distance between these side face bores 67 is half the distance between the bores 9 of side-by-side blocks 1. A central cavity common to all the bores 67 occupies the interior of each block 69.

Figure 15:
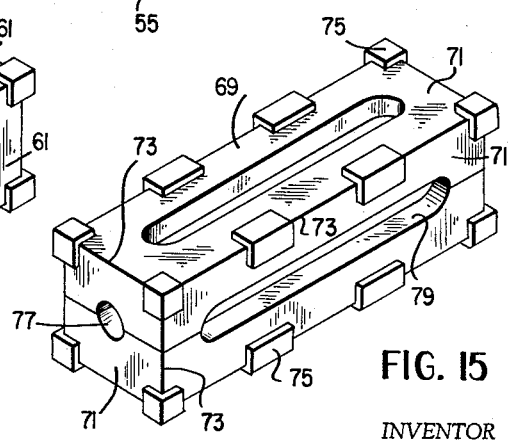
FIGURE 15 is a perspective view of a modified form of elongated block.

Still another form of elongated block is shown in FIGURE 15, in which an elongated block 69 has faces 71 some of which are square and others of which are considerably elongated. Faces 71 terminate in edges 73 between spacers 75, and bores 77 are provided in the end faces 71. In place of the plural bores 67 on the elongated faces of the embodiment of FIGURE 14, however, elongated block 69 is provided with elongated slots 79 running lengthwise of each elongated face 71 thereof. Slots 79 frictionally receive the couplers of either of FIGURES 6 and 7 but permit those couplers to mate with the block 69 at any point along slots 79. Accordingly, block 69 is useful as providing for connection at irregular spacings.

Figure 16:
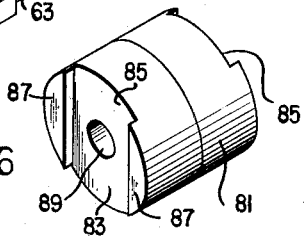
FIGURE 16 is a perspective view of a cylindrical block.

The term "block" is of course not restricted to a parallelepiped. In FIGURE 16, for example, a cylindrical block 81 is shown which has faces 83 terminating in edges 85 between spacers 87 and having bores 89 centrally thereof. Block 81 also demonstrates that the edges of the faces need not be straight, as edges 85 are arcuate. Block 81 also demonstrates that the spacers that project outward from those faces need not be more than two in number, in order to provide a recess between them including an edge over which a tool may be slid to pry out a coupler from the bore. Indeed, the spacers may even be interconnected on the side of the bore opposite the edge between the end portions of the spacers.

Figure 17:
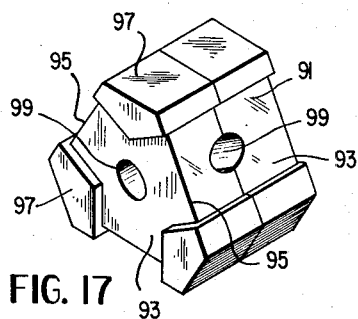
FIGURE 17 is a perspective view of a triangular block.

Another form of block which is not a parallelogram is shown in FIGURE 17, in the form of a triangular block 91 having faces 93 terminating in edges 95 spaced apart by spacers 97 with bores 99 centrally of the faces.

Figures 18, 19:
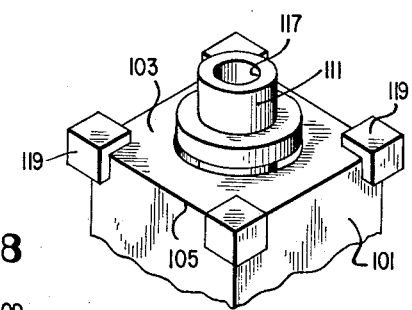
FIGURE 18 is an elevational view with parts broken away of a modified block and coupler assembly of the invention.
FIGURE 19 is a fragmentary perspective view of the structure of FIGURE 18 with the upper block removed.

In the asembly of blocks and couplers described thus far, the blocks are the female members and the couplers the male members. The reverse may be true, however, for it is also in the contemplation of the invention that the couplers be the female members and the blocks the male members. An embodiment of this is shown in FIGURES 18 and 19, in which a block 101 is provided with faces 103 terminating in edges 105. The faces 103 have pins 107 extending outward therefrom, these pins being set in recesses 109 so that the total length of the pins 107 may be greater than if they were not set in recesses. The bottoms of the recesses 109, therefore, are also portions of faces 103. Of course, if desired, faces 103 may be uniplanar, in which case pins 107 will necessarily be shorter. A coupler 111 is used which includes a central radially outwardly extending flange 113 undercut at 115 for the reception of a tool such as tool 35 between flange 113 and the outer portion of face 103, that is, the portion of face 103 which is uniplanar with edges 105. Unlike the preceding couplers, however, coupler 111 is provided with a central bore 117 in which pins 107 are removably frictionally received. In order to stabilize pins 107 in couplers 111, block 101 is provided with spacers 119 that extend outward beyond faces 103 a distance at least as great as and preferably slightly greater than the outward extent of pins 107 beyond faces 103.

Figure 20:
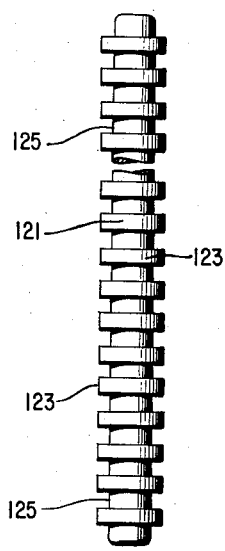
FIGURE 20 is an elevational view of a modfied coupler according to the invention.
Figure 21:
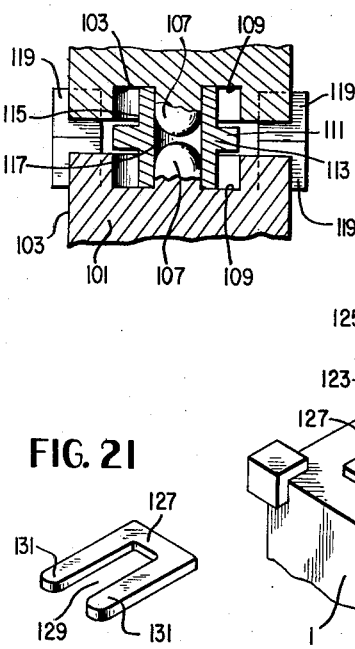
FIGURE 21 is a perspective view of a clip forming a portion of a coupling means with the coupler of FIGURE 20.
Figure 22:
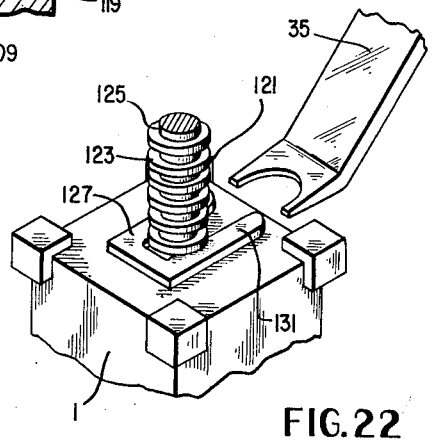
FIGURE 22 is a fragmentary perspective view of the coupling means of FIGURES 20 and 21 in use.

Another variety of coupling means is shown in FIGURES 20 and 21. This coupling means comprises a coupler 121 having an enlarged outer contour 123 and a number of spaced apart annular grooves 125 in that outer contour. A clip 127 as shown in FIGURE 21 is provided, which is flat and of generally U-shaped configuration with a central recess 129 and a pair of legs 131 one on either side of recess 129. Clip 127 is adapted to fit into any of the grooves 125 in the manner shown in FIGURE 22, and thus provides a flange means for the coupling means. The coupling means of FIGURES 20 and 21 thus differs principally from the preceding coupling means in that the flange is adjustable lengthwise of the coupling means. As there is no undercut, however, beneath which tool 35 can fit to lift off the coupling means, the coupling means of FIGURES 20 and 21 is disassembled from the block in another fashion as shown in FIGURE 22, in which it it is seen that the clip 127 is pushed off coupler 121 in the plane of clip 127 by use of the working end of tool which presses against the ends of legs 131. The fact that the spacers of the associated block extend outward beyond and on either side of the adjacent edges of the block facilitates the assembly and disassembly of the coupling means of FIGURES 20 and 21 equally well as the assemblies of the preceding embodiments, for not only is tool 35 enabled to slide in parallel to the face of the block, but also clip 127 is enabled to slide out parallel to the face of the block between the spacers of the block.

Figure 23:
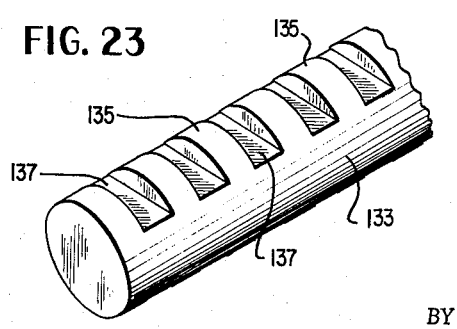
FIGURE 23 is a fragmentary perspective view of a modified form of coupler for use with the clip of FIGURE 21, in place of the coupler of FIGURE 20.
Figure 24:
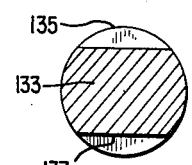
FIGURE 24 is a transverse cross-sectional view of the modified coupler of FIGURE 23.

Another variety of coupler that can be used in lieu of coupler 121 is coupler 133 shown in fragmentary perspective in FIGURE 23 and in cross section in FIGURE 24. As is there seen, coupler 133 has a cylindrical outer contour 135 that is interrupted by straight grooves 137 in alignment with each other on opposite sides of coupler 133. Coupler 133 differs functionally from coupler 121 in that coupler 133 may be used only with two diametrically opposed orientations of clip 127, the legs 131 of clip 127 fitting into grooves 137 the same as the legs 131 fit into grooves 125 of coupler 121.

Still another type of rod and clip coupling means may be provided by means of a plain rod having an outer cylindrical contour and a clip with a tapered central recess of a size to grip the rod frictionally as the clip is pushed onto the rod.

It will be noted that the coupling means of FIGURES 20–24 may be used as shown in FIGURE 1, to interconnect blocks that are spaced apart at various distances. To this end, couplers 121 and 133 preferably do not wedge frictionally in the block, but rather are held in the block by means of clips 127 that engage with the coupler on opposite sides of each block. The grooves of the coupler should therefore be formed so that a certain number of them will be spaced apart a distance equal to a unit distance between opposed faces of the blocks. For example, as shown in FIGURE 1, eight grooves equal one block thickness between opposed faces thereof.

The material from which the blocks and coupling means are constructed is preferably molded plastic, except for couplers 121 and 133, which may be either plastic or metal, and clips 127 which are preferably stamped from sheet metal.

If it is desired to fill in the space between the blocks spaced apart by coupler 121 or 133, fillers 139 may be provided which are rectangular or curved or otherwise conform to the outer contour of the associated blocks at the spacers thereof, and which are centrally pierced and sufficiently thin that they may be stacked on a coupler 121 or 133 in a quantity that will nicely fill the gap between adjacent blocks. When such fillers 139 are used, then it is not necessary to fasten the coupler 121 or 133 to a given block by more than one clip 127, the fillers 139 maintaining the blocks against those clips.

It will thus be noted that all embodiments of this invention have certain features in common. Among those common features are that a pair of blocks is provided which have contiguous faces, and coupling means are provided which extend between those faces and detachably interconnect the blocks. The coupling means have flange means bearing against each of the faces and the blocks have spacer means that extend out from those faces and are spaced apart on opposite sides of the faces. Each such face extends out to at least one edge of the block between those spacer means.

From a consideration of the foregoing disclosure, it will be obvious that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. In a construction set, a pair of blocks having first and second outwardly facing faces, the second faces being defined by portions of each block that are spaced apart by and that extend outwardly from said first faces so that said second faces are spaced outwardly from said first faces, and coupling means detachably interconnecting said blocks and extending between and bearing against said first faces, each said first face extending out to at least one edge of the associated block between said outwardly extending portions of the associated block, the coupling means having flange means recessed adjacent the first face of at least one block to receive a tool inserted along said first face between said outwardly extending portions of said at least one block, the coupling means having pins extending from the flange means and removably held in bores in the blocks.

2. In a construction set as claimed in claim 1, said pins extending in opposite directions from the flange means.

3. In a construction set as claimed in claim 2, said first faces of said pair of blocks confronting each other and being spaced apart and said second faces of said pair of blocks contacting each other.

4. In a construction set as claimed in claim 1, said pins extending in the same direction from the flange means.

5. In a construction set as claimed in claim 4, said first faces of said pair of blocks being in alignment with each other and facing in the same direction, the coupling means extending between said outwardly extending portions.

6. In a construction set as claimed in claim 5, said coupling means extending away from said first faces no farther than said second faces.

References Cited by the Examiner

UNITED STATES PATENTS

| | | | |
|---|---|---|---|
| 956,632 | 5/10 | Finch | 46—26 |
| 1,294,446 | 2/19 | Greenstreet | 46—26 |
| 1,514,081 | 11/24 | Hahn | 50—443 X |
| 1,765,644 | 6/30 | Aukenthaler | 46—26 |
| 1,932,074 | 10/33 | Johnson | 46—29 X |
| 1,958,508 | 5/34 | Audet | 46—25 |
| 2,885,822 | 5/59 | Onanian | 46—24 X |
| 2,940,760 | 6/60 | Brinkman | 46—24 X |
| 3,002,315 | 10/61 | Kuhn | 46—25 X |
| 3,005,282 | 10/61 | Christiansen | 46—25 |

FOREIGN PATENTS

| | | |
|---|---|---|
| 229,550 | 7/59 | Australia. |
| 416,130 | 9/34 | Great Britain. |
| 1,180,316 | 12/58 | France. |

DELBERT B. LOWE, *Primary Examiner.*